United States Patent
Jinnouchi (10) Patent No.: US 6,697,883 B1
(45) Date of Patent: Feb. 24, 2004

(54) PC CARD (75) Inventor: Koki Jinnouchi, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 448 days.

(21) Appl. No.: 09/712,152

(22) Filed: Nov. 15, 2000

(30) Foreign Application Priority Data

Mar. 28, 2000 (JP) ...................... 2000-089242

(51) Int. Cl.⁷ .................. G06F 3/00; H06K 13/00
(52) U.S. Cl. .................. 710/14; 710/301; 713/300
(58) Field of Search .................. 710/62, 72, 301, 710/8, 14; 713/320, 323, 300, 340

(56) References Cited

U.S. PATENT DOCUMENTS

| | | | | |
|---|---|---|---|---|
| 5,689,430 A | * | 11/1997 | Ohno et al. ............... 702/64 |
| 5,706,239 A | * | 1/1998 | Brys ...................... 365/226 |
| 5,734,618 A | * | 3/1998 | Mizuta ................... 365/229 |
| 5,761,061 A | * | 6/1998 | Amano .................... 700/82 |
| 5,818,781 A | | 10/1998 | Estakhri et al. |
| 5,928,336 A | * | 7/1999 | Takeuchi .................. 710/1 |
| 6,085,982 A | * | 7/2000 | Nakashima ............... 235/492 |
| 6,153,949 A | * | 11/2000 | Soderhall ................ 307/125 |
| 6,292,858 B1 | * | 9/2001 | Inkinen et al. ........... 710/301 |

FOREIGN PATENT DOCUMENTS

| | | |
|---|---|---|
| JP | 07-010967 | 8/1996 |
| JP | 09/016735 | 1/1997 |
| JP | 09/179802 | 7/1997 |
| JP | 10/063804 | 3/1998 |
| JP | 10/171959 | 6/1998 |
| WO | WO 95/08222 | 3/1995 |

OTHER PUBLICATIONS

"PCMCIA Architecture", Anderson, Addison–Wesley Publishing Co., XP000926398, pp. 50–54, (no date).

* cited by examiner

Primary Examiner—Kim Huynh
(74) Attorney, Agent, or Firm—Nixon & Vanderhye P.C.

(57) ABSTRACT

A PC card can select one function from a plurality of functions, and comprises an information transmission means (S2, S7) for giving information corresponding to the selected function to an electronic device, and an execution means (S5, S10) for performing operation corresponding to the selected function.

13 Claims, 5 Drawing Sheets

PC CARD

BACKGROUND OF THE INVENTION

1. Field of the Invention

The present invention relates to a PC card, which is connected to an electronic device such as a computer, through a connector.

2. Description of the Prior Art

A PC card (for example, a PCMCIA (Personal Computer Memory Card International Association) card, a JEIDA (Japan Electronic Industry Development Association) card, and a compact flush card, and so on) connected to an electronic device such as a computer gives information indicative of the function of the PC card to the electronic device by outputting CIS (complex instruction set) information to the electronic device. When the PC card is connected to the electronic device, its operating supply voltage is supplied from the electronic device, and the supply voltage is either 5V or 3.3V.

Figure 4:
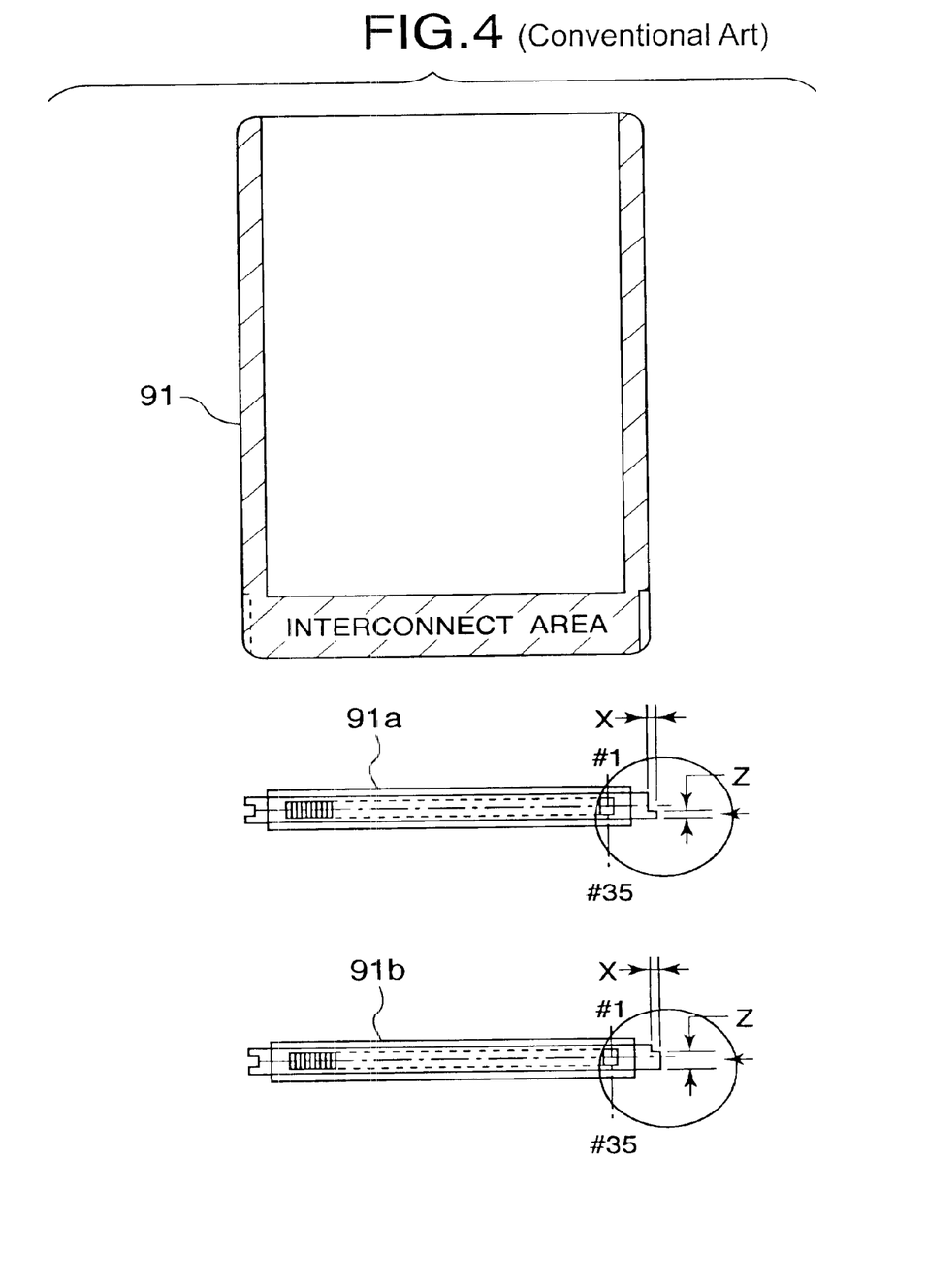
FIG. 4 shows top and side views of a PC card.
Figure 5A:
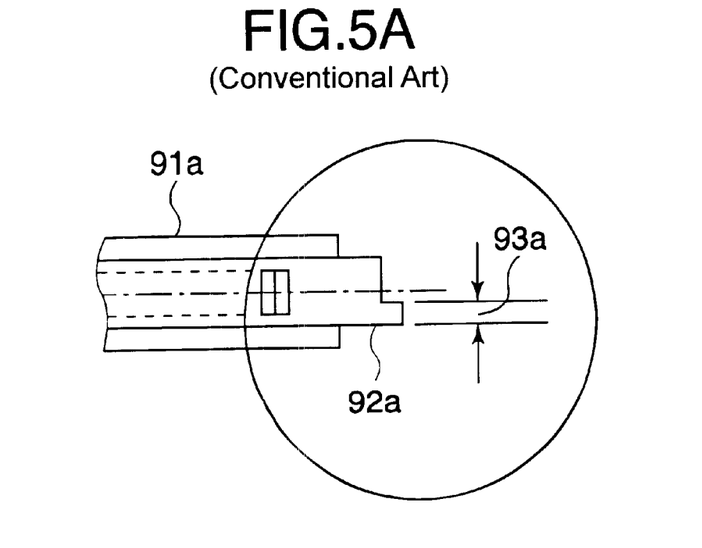
FIG. 5A and FIG. 5B show an enlarged view of a key part of a PC card.
Figure 5B:
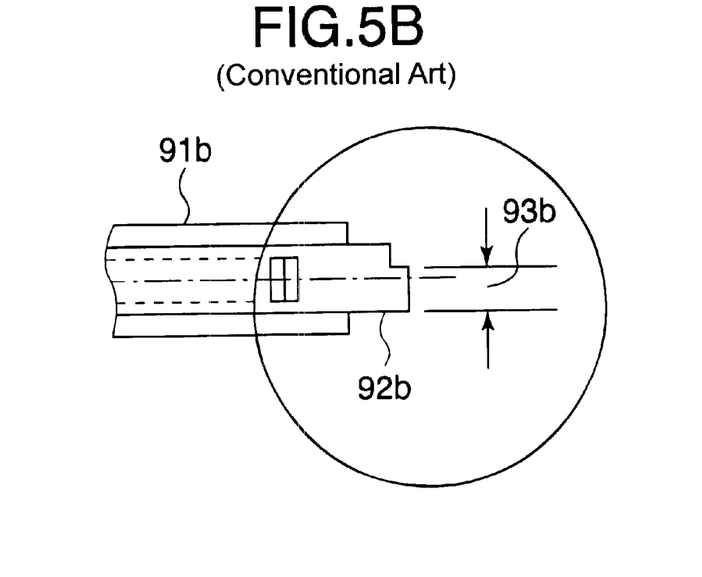

Therefore, key parts 92a, 92b are formed near the end of the connectors of a PC cards 91a, 91b, and, the key parts 92a, 92b are provided with two types of key parts 92a having a thinner thickness (denoted by 93a), and 92b having a thicker thickness (denoted by 93b), as shown in FIGS. 4 and 5. The key part 92a is formed in the PC card 91a operating at the supply voltage of 5V or 3.3V, and the key part 92b is formed in the PC card 91b operating at the supply voltage of 3.3V.

A receptacle corresponding to the key part 92 is formed at the connector provided inside a computer to which the PC card 91 is connected. The receptacle provides two types, i.e. one corresponding to the key part 92a, and the other corresponding to the key part 92b. The receptacle corresponding to the key part 92a is formed at a computer, which only supports the supply voltage of 5V. Therefore, an attempt to insert the PC card 91b operating at 3.3V into the computer, which only supports the supply voltage of 5V fails.

On the other hand, insertion of the PC card 91a operating at 5V, and the PC card 91b operating at 3.3V into the computer succeeds, which has a receptacle corresponding to the key part 92b. Then, the computer is burdened a load that it has to distinguish whether the inserted PC card 91 operates at 5V or 3.3V.

For accomplish this requirement, from a point of view of software, the PC card 91 is configured to give information indicative of a required supply voltage to the computer by sending CIS information to it, and, from a point of view of hardware, by making the VS1/VS2 pins in H level (open), or in L level (ground level).

However, the above configuration has the following problems. That is, the CIS information indicative of the function of the PC card has a previously set configuration. Therefore, frequent design changes of the PC cards have been required for each function.

Moreover, the PC card has a configuration only to output CIS information instructing the electronic device that which supply voltage of 5V or 3.3V should be supplied to the PC card. Therefore, designers have been under the necessity of designing the PC cards to be operable at either 5V or 3.3V. Accordingly, it has been difficult to design the PC cards, when there are functions which are desirable to operate at 5V and 3.3V. For example, where a design attempt is made so as to realize a multi-purpose PC card with an attachment part such as a telephone part added to the back of the PC card.

SUMMARY OF THE INVENTION

The present invention has been made to solve the above problems, and an object thereof is to offer a PC card changing information, instructing a function to an electronic device, to which the PC card is connected and the PC card may execute multi-functions.

Another object, other than the above object, is to offer a PC card supplied with suitable operating supply voltage according to functions by setting information chargeable, instructing operating supply voltage to be supplied.

Still another object, other than above objects, is to offer a PC card to reduce power consumption during operation without charging a secondary battery, even when it is chargeable.

Yet another object, other than the above objects, is to offer a PC card to perform operation corresponding to the lower supply voltage, in spite of supply of the high operating supply voltage is required, and the supplied supply voltage is lower than the required supply voltage.

In order to solve the above problems, a PC card according to the present invention comprises an information transmission means for giving information, which is corresponding to the selected function, to the electronic device, selectable one function from a plurality of functions, and connected to a connector of the electronic device, which performs operation corresponding to given information through the connector; and an execution means for executing operation corresponding to the selected function.

That is, operation of the electronic device is determined by information given by the information transmission means (operation corresponding to the selected function). While, the selected function is executed in the PC card by the execution means.

Moreover, a PC card according to the present invention comprises an information transmission means for giving information, which is corresponding to the selected function, to the electronic device, selectable one function from two functions namely a first and a second function, and connected to a connector of the electronic device, which performs operation corresponding to given information through the connector and supplies operating supply voltage to the connector when takes the higher supply voltage as a first supply voltage and the lower supply voltage as a second supply voltage; and an execution means for executing operation corresponding to the selected function. The above information transmission means gives information that makes the above supply voltage at the first supply voltage to the above electronic device when the PC card is in a state of the first function, and information that makes the above operating supply voltage at the second supply voltage to the above electronic device, when the PC card is in a state of the second function.

That is, the electronic device outputs the first supply voltage to the PC card when the PC card is in a state of the first function, and the second supply voltage to the PC card when the PC card is in a state of the second function.

Further, the above execution means, provided with a secondary battery other than the above configuration, charges the secondary battery when the PC card is in a state of the first function.

That is, when the secondary battery is not charged, the power consumption of the PC card is reduced, as the PC card is in a state of the second function.

Still further, the execution means comprises a voltage detection part when the PC card is in a state of the first function, the results of the voltage detection part shows that the above operating supply voltage is lower than the first supply voltage, the above execution means performs operation corresponding to a state of the second function.

That is, operation corresponding to the lower supply voltage of the operating supply voltage is executed when the supply voltage is lower than a predetermined value.

The details of the embodiment of the present invention are set fort in the accompanying drawings and the description below. Other features, objects, and advantages of the present invention will be apparent from the description and drawings, and from the claims.

DETAILED DESCRIPTION OF THE INVENTION

Embodiment of the present invention will be described below, referring to the drawings.

Figure 3:
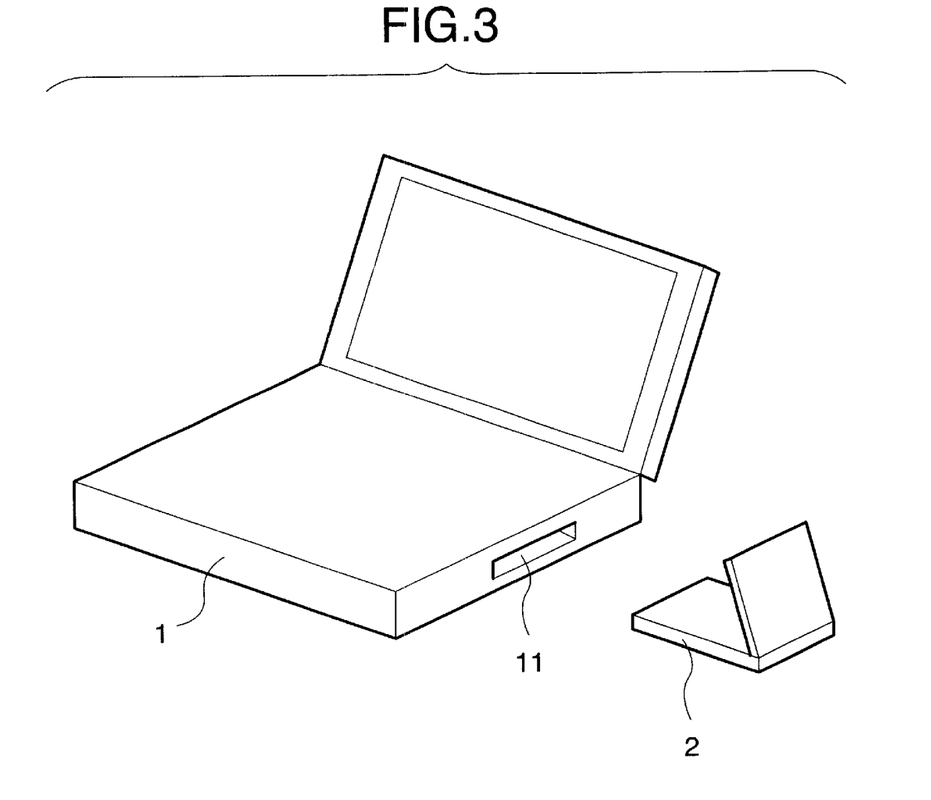
FIG. 3 shows a schematic perspective view of a PC card and a computer, to which the PC card is connected.

FIG. 3 shows a schematic perspective view of a PC card and a computer, to which the PC card according to the present embodiment is connected.

In FIG. 3, a computer (electronic device) 1 has a configuration comprising a PCMCIA/JEIDA card insertion device. Therefore, it has a connector 11 to which the above card is inserted.

A PC card 2 is a card confronting with the standard for the aforementioned PC card, or a compact flash memory (hereinafter, referred to as a PC card), and a portable electronic device with functions as a PC card and additional functions as a portable telephone.

Figure 2:
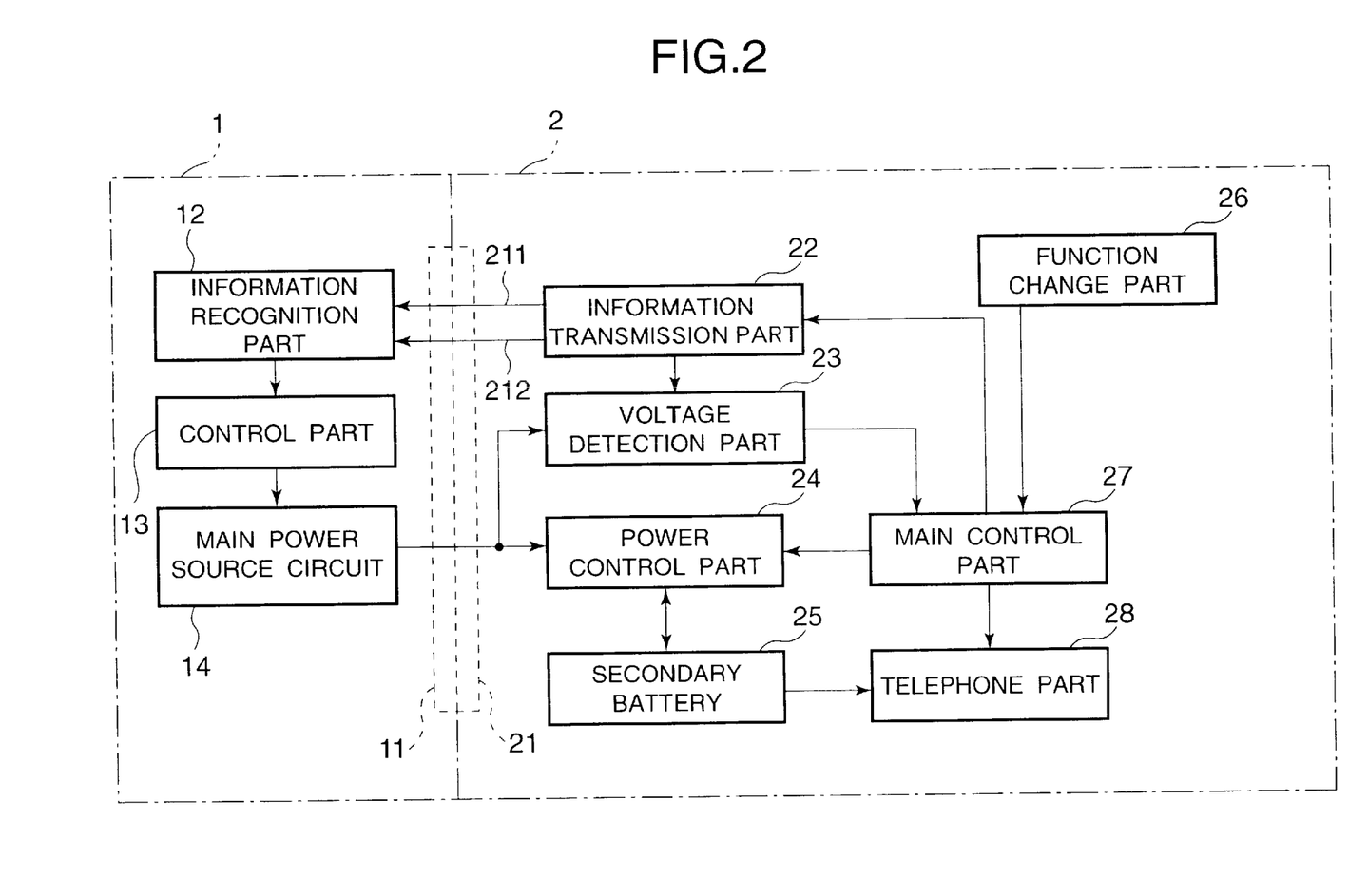
FIG. 2 shows an internal block diagram of an electrical configuration of a PC card and a computer.

FIG. 2 shows an internal block diagram of a PC card and an electrical configuration. The computer 1 mainly comprises a connector 11, an information recognition part 12, a control part 13, and a main power source circuit 14. The PC card 2 includes a connector 21, an information transmission part 22, a voltage detection part 23, a power source control part 24, a secondary battery 25, a function change part 26, a main control part 27, and a telephone part 28.

Specifically, the connector 21 comprises a group of terminals having VS1/VS2 pins and a pin 212 for outputting the CIS information, which are connected to the connector 11 provided in the computer 1. The key part indicating the operating supply voltage has a shape (See 92b in FIG. 5) corresponding to 3.3V.

The information transmission part 22 is a block to transmit information indicative of an operating supply voltage required by the PC card 2, and so on to the computer 1, when the PC card 2 is connected to the computer 1. When the information transmission part 22 receives a notification from the main control part 27 that 5V (the first supply voltage) will be taken as the operating supply voltage, it generates the CIS information corresponding to 5V and outputs it to the information recognition part 12. Moreover, VS1/VS2 pins 211 of the connector 21 are made in H level. On the other hand, when the information transmission part 22 is received a notification from the main control part 27 that 3.3V (the second supply voltage) will be taken as the supply voltage, it generates the CIS information corresponding to 3.3V and outputs it to the information recognition part 12. Furthermore, VS1/VS2 pins 211 are made in L level.

The power control part 24 generates the operating supply voltage required for each block 22, 23, 25–27 in the PC card 2 by converting the supply voltage output from the main power source circuit 14. Further, when charging of the secondary battery 25 is instructed by the main control part 27, the secondary battery 25 is charged The voltage detection part 23 is a block to detect operating supply voltage output from the main power source circuit 14, and to give information indicative of the results to the main control part 27.

The function change part 26 is a block comprising a plurality of key switches, and is used for input to select functions executed by the PC card 2, and so on. That is, instructions and so on are input to indicate which function the PC card 2 will be executed out of two types of functions including a function (the first function) to charge the secondary battery 25 in a state where the operating supply voltage of 5V is output from the computer 1, and a function (the second function) to perform a predetermined operation in a state where the supply voltage of 3.3V is output from the computer 1.

The telephone part 28 is a block to execute operation to use the PC card 2 as a portable telephone. That is, it detects incoming call to the PC card 2, performs outgoing call from the PC card 2, and communicates with the other parties.

The secondary battery 25 is a block to supply operating supply voltage to the telephone part 28. It is charged by the power control part 24, when the PC card 2, in a state of the first, is connected to the computer 1, and supplies the supply voltage to the block in the PC card 2 through the power control part 24 when the supply voltage is not supplied from the outside of the PC card 2.

The main control part 27 is a block to control main operations of the PC card 2. It makes the information transmission part 22 generate the CIS information denoting 5V, and makes the VS1/VS2 pins 211 in H level when an input to the function change part 26 is for the first function. Moreover, the main control part 27 makes the information transmission part 22 generate the CIS information denoting 3.3V, and makes the VS1/VS2 pins 211 in L level when the input to the function change part 26 is for the second function.

The connector 11 comprises a group of terminals to which the connector 21 of the PC card 2 is connected, and the receptacle has a shape suitable for acceptance of the key part (See 92b in FIG. 5) for 3.3V.

The information recognition part 12 is a block to judge whether the operating supply voltage required by the PC card 2 is 5V or 3.3V, and to output the results to the control part 13. That is, it determines whether the CIS information output from the information transmission part 22 is information denoting 5V or the 3.3V, and sends the results to the control part 13. Also, it detects whether the VS1/VS2 pins 211 are in H level or L level, and outputs the results to the control part 13.

The main power source circuit 14 is a voltage regulator part to generate the operating supply voltage required by the PC card 2, and outputs it to the PC card 2. That is, when the control part 13 instructs generation of the supply voltage of 5V to the main power source circuit 14, the main power source circuit 14 generates 5V and outputs it to the PC card 2. Otherwise, when the control part 13 instructs generation of the supply voltage of 3.3V to the main power source circuit 14, the main power source circuit 14 generates 3.3V and outputs it to the PC card 2.

The control part 13 is a block to control main functions as an interface between the computer 1 and the PC card 2. Therefore, it makes the main power source circuit 14 generate an operating supply voltage of 5V when the output of the information recognition part 12 instructs generation of the supply voltage of 5V. Otherwise, it makes the main power source circuit 14 generate an operating supply voltage of 3.3V when the output of the information recognition part 12 instructs generation of the supply voltage of 3.3V.

Figure 1:
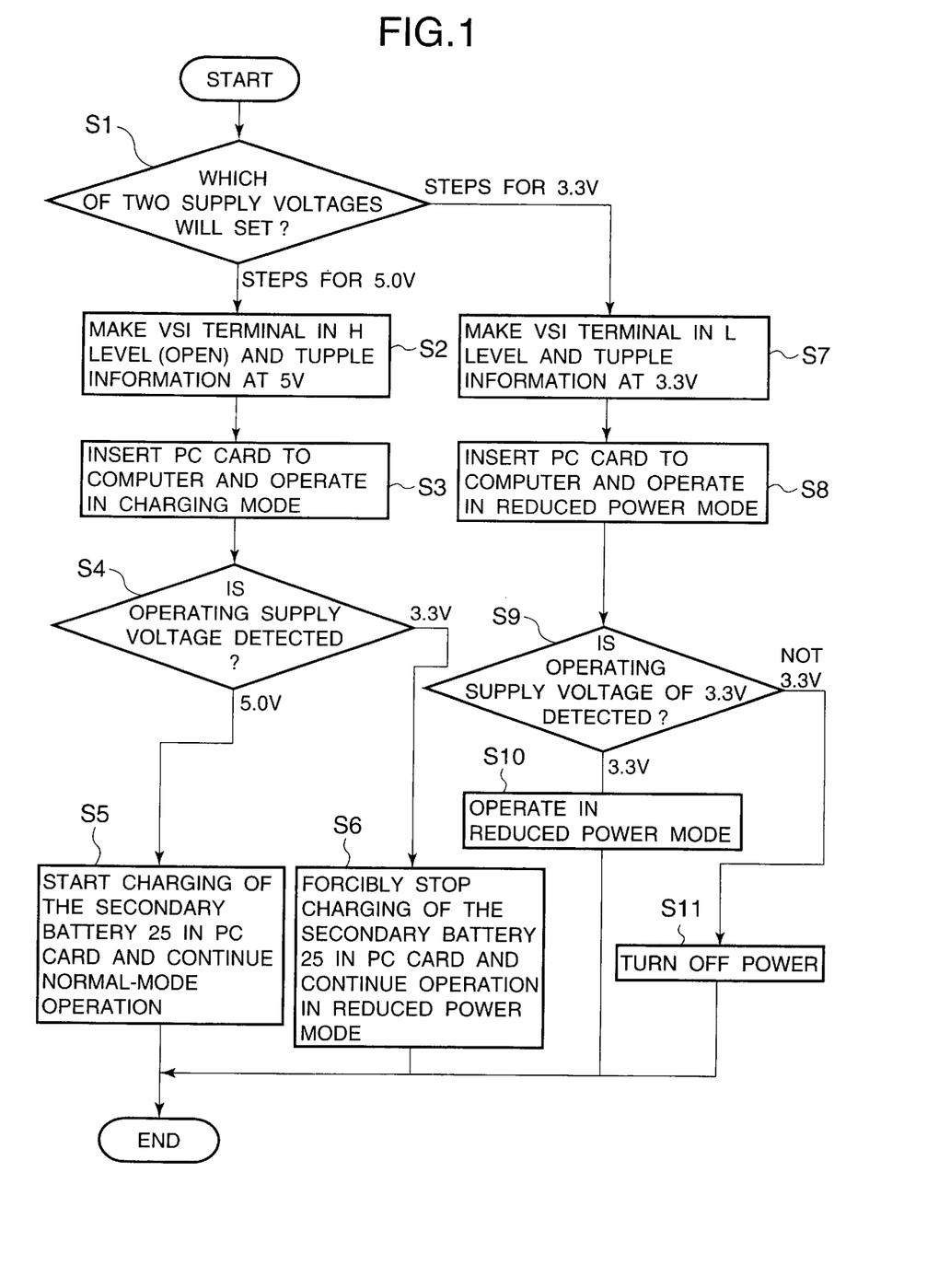
FIG. 1 shows a flow chart of main operations of a PC card of one embodiment according to the present invention.

FIG. 1 shows a flow chart of main operations according to the present embodiment. The operations of the present embodiment will be described below, referring to the above drawing, as required.

Specifically, the first function is a function to make the PC card 2 perform charging operation of the secondary battery 25, and is executed when the operating supply voltage is 5V.

On the other hand, the second function is a function to perform predetermined operations when the operating supply voltage is 3.3V. The reason why the supply voltage should be 3.3V is to reduce the power consumption of the PC card when the second function is performed, That is, when the consumption current is the same, the lower the operating supply voltage, the smaller the power consumption. Therefore, when it is in a state of the second function, the operating supply voltage of the PC card is reduced, as the supply voltage becomes lower. This promotes decreasing of the load of the computer 1, to which the PC card 2 is connected.

Further, operations in a state of the second function are also executable, even when the operating supply voltage is 5V. However, when the supply voltage is 5V, the power consumption of the PC card 2 is increased for the above reason. That is, the second function according to the present embodiment enables execution of function, which is executable in the first function at the supply voltage of 3.3V, in order to reduce the power consumption.

Then, the operations of the present invention will be described below. When the PC card 2 is connected to the computer 1 so as to charge the secondary battery 25, an instruction indicative of the first function is input to the function change part 26, before connection of the PC card 2 to the computer 1. When the above instruction is input to the function change part 26, the main control part 27 gives an instruction that makes the operating supply voltage at 5V to the information transmission part 22. The information transmission part 22 makes the VS1/VS2 pins 211 in H level in response to the above instruction. Tupple information in the CIS information stored in the internal memory (not shown) is made to that denoting 5V (the information transmission means) (steps S1, S2).

In the above state, the connector 21 of the PC card 2 is connected to the connector 11 of the computer 1. When the above connecting operation is completed, the information transmission part 22 outputs the CIS information including the tupple information denoting 5V to the information recognition part 12. The information recognition part 12 detects that the VS1/VS2 pins 211 are in H level. Then, the information recognition part 12 determines that the operating supply voltage of 5V is required by the PC card 2, and outputs the results to the control part 13. As a result, since the control part 13 gives an instruction that makes the supply voltage at 5V to the main power source circuit 14, the main power source circuit 14 generates the supply voltage of 5V, and outputs it to the power control part 24. The power control part 24 starts charging of the secondary battery 25 based on the supply voltage of 5V (execution means) (step S3).

On the other hand, the voltage detection part 23 checks whether the operating supply voltage is at a required supply voltage of 5V. If the above supply voltage is 5V, the voltage detection part 23 informs the main control part 27 that the supply voltage is 5V. Therefore, the main control part 27 makes the power control part 24 continue charging operation of the secondary battery 25 (steps S4, S5).

When the operating supply voltage is 3.3V, rather than 5V, the voltage detection part 23 informs the main control part 27 that the supply voltage is 3.3V. For this reason, the main control part 27 forces the power control part 24 to stop charging of the secondary battery 25. Then, the power control part 24 makes a control to operate the PC card 2 in a state of the second function. Consequently, the power consumption of the PC card 2 may be reduced (steps S4, S6).

The description for the case where an instruction input to the function change part 26 is the first function is here ended. Next, a description of operation for the case where an instruction for execution of the second function is input to the function change part 26 will be described.

When the PC card 2 is required to execute an operation different from charging operation of the secondary battery 25, instruction for the second function is input to the function change part 26, before connection of the PC card 2 to the computer 1. When the instruction is input to the part 26, the main control part 27 gives an instruction that makes the operating supply voltage at 3.3V to the information transmission part 22. The information transmission part 22 makes the VS1/VS2 pins 211 in L level in response to the above instruction. Tupple information in the CIS information stored in the internal memory (not shown) is made to that denoting 3.3V (the information transmission means) (steps S1, S7).

In the above state, the connector part 21 of the PC card 2 is connected to the connector 11 of the computer 1. When the above connecting operation is completed, the information transmission part 22 outputs the CIS information including the tupple information denoting 3.3V to the information recognition part 12. The information recognition part 12 detects that the VS1/VS2 pins 211 are in L level. Then, the information recognition part 12 determines that the operating supply voltage of 3.3V is required by the PC card 2, and outputs the results to the control part 13. As a result, since the control part 13 gives an instruction that makes the supply voltage at 3.3V to the main power source circuit 14, the main power source circuit 14 generates the supply voltage of 3.3V, and outputs it to the power control part 24. The power control part 24 generates supply voltages required for each block based on the supply voltage of 3.3V. As a result, the PC card 2 executes predetermined operations in reduced power consumption (execution means) (step S8).

On the other hand, the voltage detection part 23 checks whether the operating supply voltage is at a required supply voltage of 3.3V. If the above supply voltage is 3.3V, the voltage detection part 23 informs the main control part 27 that the supply voltage is 3.3V. Therefore, the main control part 27 controls execution of predetermined operations (Steps S9, S10).

When the operating supply voltage is lower than 3.3V, other than 3.3V, the voltage detection part 23 informs the main control part 27 of the above state. For this reason, the main control part 27 gives an instruction to the power control part 24 to make the power supply off. Consequently, since the power control part 24 stops the output of the operating supply voltage to each block, the operation of the PC card 2 is stopped (steps S9, S11).

Even when the supply voltage output from the main power source circuit 14 exceeds 3.3V in a state of the second function, the voltage detection part 23 does not give the above information to the main control part 27. The reason is as follows:, even when the operating supply voltage of 5V is supplied, in a state of the second function where the supply voltage of 3.3V is supplied by the computer 1, the power control part 24 generates the supply voltage required for each block by a voltage regulator (not shown) provided therein to supply it to each block. Thus, operations in a state of the second function may be executed without any difficulties.

The present invention is not limited to the above embodiment. One exemplary embodiment has been described in terms of a case where instruction for the function is input to the function change part 26, before connection of the PC card 2 to the computer 1, in order to change the function from a state of the first function to the second one, or vice versa. Alternatively, for example, it will be understood that the function of the PC card 2 may be set from the computer 1. That is, in a state where the PC card 2 is connected to the computer 1, the computer 1 sets the function of the PC card 2. The function set at this moment is invalid, while the PC card 2 remains connected to the computer 1, the function set is only stored in the memory (not shown) of the main control part 27. Once the PC card 2 is detached from the computer 1, the function set becomes effective. That is, when the PC card 2 is detached form the computer 1, the main control part 27 sets the information transmission part 22 so that the function stored in the main control part 27 is executed. In this way, when the PC card 2 is connected to the computer 1 again, the PC card 2 executes the function set by the computer 1.

Another method of changing the function may be realized based on the results by the main control part 27. That is, the output supply voltage of the secondary battery 25 is detected by the voltage detection part 23. When the detected supply voltage reaches the level at which the charging is necessary, the main control part 27 automatically changes the function to the first function. Alternatively, the function is automatically changed by the main control part 27, based on information output from the connected computer 1 or the amounts of consumption of the secondary battery 25.

Hereinbefore, configuration of the present invention has been described in terms of the case where two types of functions are executed. One is executed when the operating supply voltage is 3.3V, and the other when it is 5V. Alternatively, another configuration may be possible, that is, it acts as a single function card, which executes a third function at some times, or a fourth function or a fifth function at other times whenever it is connected to the computer 1, though the operating supply voltage supplied from the computer 1 is kept at a predetermined value That is, a PC card is allowed to be a configuration incorporating two types of functions, one is for a modem card and the other is for a memory card. Thus, it has a freedom in execution of the selected function from the above two functions according to user's selection.

Also, a PC card is allowed to be a configuration incorporating three types of functions, first is a LAN card, second is a modem card, third is a memory card. Thus, it has a freedom in execution of the selected function from the above three functions according to user's selection.

Further, software will be installed in the computer 1 for the PC card 2 to take above configuration, in order to make it possible to perform operations corresponding to each of the above functions (a LAN card, a modem card, and a memory card).

As described above, a PC card according to the present invention can select one function from a plurality of functions, and comprises an information transmission means for giving information corresponding to the selected function to the above electronic device, and an execution means for performing operation corresponding to the selected function.

Accordingly, the electronic device may perform an operation corresponding to the selected function. The selected function may be executed by the execution means, resulting in successful execution of a number of functions. Therefore, a number of functions may be executed.

In a state of the first function, the information transmission means gives the electronic wet device information which instructs the electronic device to make the operating supply voltage at the first supply voltage. In a state of the second function, it gives the electronic device information which instructs the electronic device to make the above supply voltage at the second supply voltage. As a result, the electronic device outputs the first supply voltage when the PC card is in the first function, and the second supply voltage in the second function. This enables supply of the suitable operating supply voltage to the PC card according to the selected function.

In a state of the first function, the execution means charges the secondary battery. Accordingly, when charging of the battery is not done, it becomes a state of the second function to reduce the power consumption. Therefore, when performing operation during which the battery is not charged, power consumption may be reduced, even when the battery is chargeable.

Moreover, the execution means is provided with a voltage detection part. It performs operation corresponding to a state of the second function, when the detected supply voltage of the part shows that the operating supply voltage is lower than the first supply voltage in a state of the first function, the execution means performs operation corresponding to a state of the second.

Therefore, it may be possible to perform operation corresponding to the lower supply voltage, when the supplied voltage is lower than the required supply voltage.

What is claimed is:

1. A PC card to be inserted into a port of an external electronic device, the PC card comprising:

means for causing the PC card to perform at least first and second different functions;

means for requesting the external electronic device to supply a first supply voltage to the PC card when the PC card is to perform the first function, and for requesting the external electronic device to supply a second and different supply voltage to the PC card when the PC card is to perform the second function; and wherein the first supply voltage is higher than the second supply voltage, and wherein the first function comprises charging a secondary battery of the PC card.

2. The PC card of claim 1, wherein the first supply voltage is 5V, and the second supply voltage is 3.3V.

3. The PC card of claim 1, wherein the second function comprises operation in a reduce power mode.

4. The PC card of claim 1, further comprising a voltage detection circuit for determining what voltage is being supplied to the PC card from the external electronic device, wherein the voltage detection circuit also receives input from said means for requesting.

5. A PC card to be inserted into a port of an external electronic device, the PC card comprising:

a controller for causing the PC card to perform at least first and second different functions;

a transmission circuit for requesting the external electronic device to supply a first supply voltage to the PC card when the PC card is to perform the first function, and for requesting the external electronic device to supply a second and different supply voltage to the PC card when the PC card is to perform the second function; and wherein the first supply voltage is higher than the second supply voltage, and wherein the first function comprises charging a secondary battery of the PC card.

6. The PC card of claim 5, wherein the first supply voltage is 5V, and the second supply voltage is 3.3V.

7. The PC card of claim 5, wherein the second function comprises operation in a reduce power mode.

8. The PC card of claim 5, further comprising a voltage detection circuit for determining what voltage is being supplied to the PC card from the external electronic device, wherein the voltage detection circuit also receives input from said means for requesting.

9. The PC card of claim 5, wherein the external electronic device is a computer.

10. A method of using a PC card which is adapted to be inserted into a port of an external electronic device, the method comprising:

causing the PC card to perform one of at least first and second different functions;

requesting the external electronic device to supply a first supply voltage to the PC card when the PC card is to perform the first function, and requesting the external electronic device to supply a second different supply voltage to the PC card when the PC card is to perform the second function; and wherein the first supply voltage is higher than the second supply voltage, and wherein the first function comprises charging a secondary battery of the PC card.

11. The method of claim 10, wherein the first supply voltage is 5V, and the second supply voltage is 3.3V.

12. The method of claim 10, wherein the second function comprises operation in a reduce power mode.

13. The method of claim 10, wherein the external electronic device is a computer.

* * * * *